(No Model.)
C. P. SHUFELT.
KNOTTING MECHANISM FOR GRAIN BINDERS.
No. 318,809. Patented May 26, 1885.
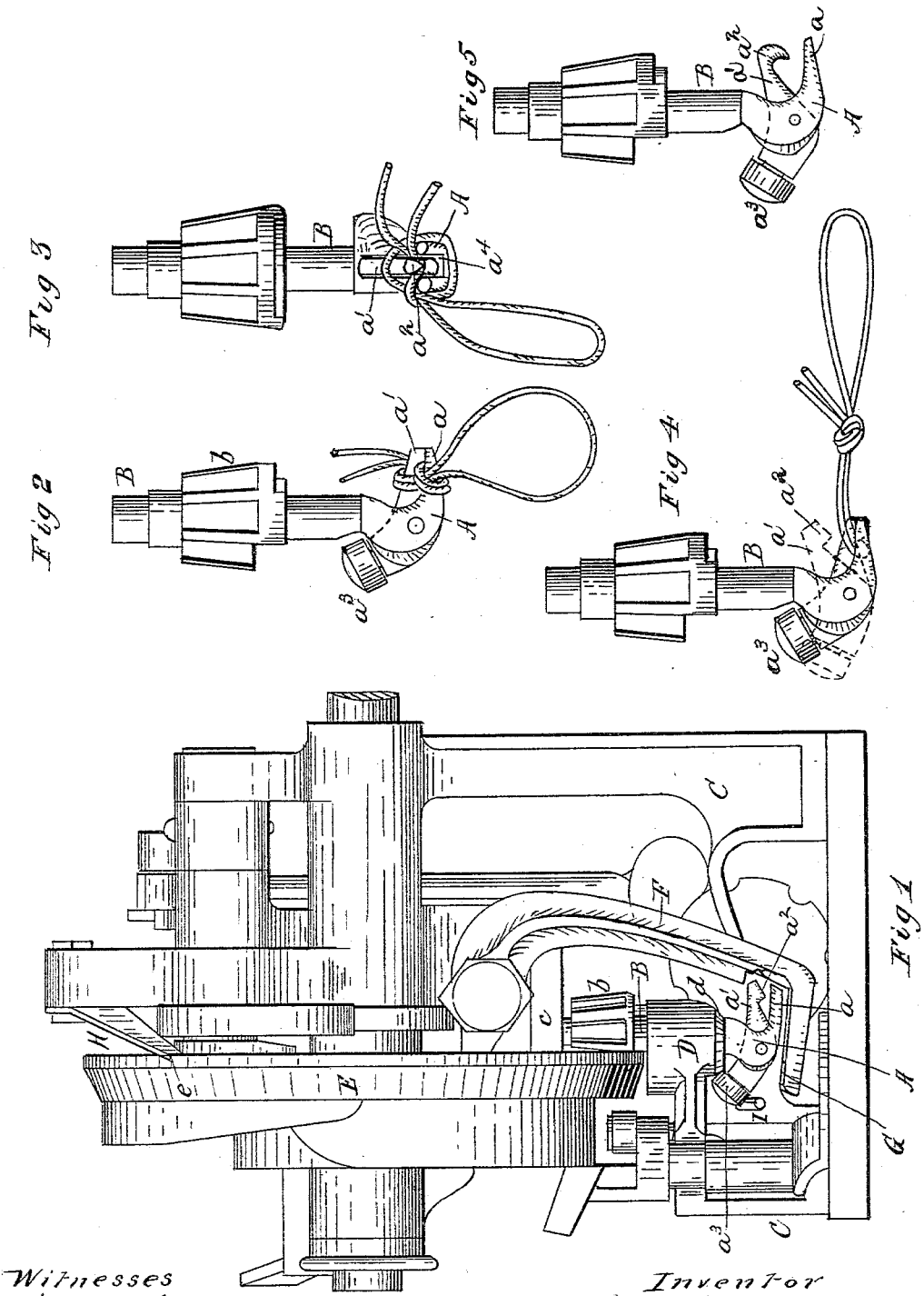
Witnesses
W. C. Cailes
A. M. Best
Inventor
Calvin P Shufelt
By Coburn & Thacher
Attorneys

UNITED STATES PATENT OFFICE.

CALVIN P. SHUFELT, OF SANDWICH, ILLINOIS, ASSIGNOR OF ONE-HALF TO J. PHELPS ADAMS AND HENRY A. ADAMS, BOTH OF SAME PLACE.

KNOTTING MECHANISM FOR GRAIN-BINDERS.

SPECIFICATION forming part of Letters Patent No. 318,809, dated May 26, 1885.

Application filed November 23, 1882. (No model.)

*To all whom it may concern:*

Be it known that I, CALVIN P. SHUFELT, a citizen of the United States, residing at Sandwich, in the county of De Kalb and State of Illinois, have invented certain new and useful Improvements in Knotting Mechanism for Grain-Binders, which are fully set forth in the following specification, reference being had to the accompanying drawings, in which—

Figure 1 represents an inside elevation of a portion of a grain-binder, showing my improved knotting-hook and the adjacent parts; Fig. 2, a detail side elevation of the hook with its shaft and pinion on an enlarged scale, the hook being represented as in position just after the loop has been formed and the twine cut; Fig. 3, an end elevation of the same on the same scale; Fig. 4, a side elevation of the same similar to Fig. 2, showing the hook just after the loop has been shed and the knot formed on the same scale; and Fig. 5 a similar side elevation of the same, showing the hook in position as it stands at rest in the machine and ready to start on its movement to form a loop, and also a modified form of the hooked end of the movable jaw.

My invention relates to grain-binders in which twine is used for the band; and it consists in the combination of certain devices, which will be hereinafter described, and definitely set forth in the claim.

I will proceed to describe in detail the construction and operation of my invention, and will then point out definitely in the claim the special improvements which I believe to be new and wish to protect by Letters Patent.

In the drawings, A represents a knotting-hook, which is at one end of a shaft, B, as usual, the said shaft being provided near its other end with the usual pinion, $b$. This knotting-hook is composed of two parts or jaws, one, $a$, being rigid, and the other, $a'$, pivoted to the former. In this instance the rigid jaw is the extreme or outer one, and the swinging jaw passes through a slot in the shank of this rigid jaw, within which it is pivoted, and is inside of the fixed jaw, as shown in the drawings. At its extremity it is provided with a short hook, $a^2$, and its heel projects beyond the slot in the fixed jaw, and is provided with an anti-friction roller, $a^3$. The hook $a^2$ on the end of the movable jaw is preferably constructed with its inner face inclined outward, as shown in Figs. 1 and 4 of the drawings, for a purpose which will be presently explained. It may, however, be made with nearly a straight face or turning slightly inward, as shown in Fig. 5 of the drawings, if desired.

The two jaws of the knotting-hook are so constructed and arranged relatively to each other that the space between them at any point when closed is less than the size of the twine, so that the latter will always be clamped and held firmly between the jaws when they are closed upon it, even if there is but a single strand within the jaws. This knotting-hook is mounted in the frame-standard C (shown in Fig. 1 of the drawings) which is of the usual construction and need not be explained in detail here, the upper end of the shaft having its bearing in a cross-piece, $c$, while the other end of the shaft is held in a bracket-bearing, D, of tubular construction, beyond which is the knotting-hook, as shown in Fig. 1 of the drawings. The end of the tubular bearing D next to the knotting-hook is beveled or otherwise constructed to provide a cam-track, $d$, for the roller on the end of the pivoted jaw, for the purpose of securing certain movements, as will presently be explained. A wheel, E, is provided with gear-teeth arranged to engage with the knotter-pinion to produce the necessary rotation of the latter at the proper time, and a stripper, F, and a cutter, G, are also provided to perform the usual functions of these parts in this class of machines. A spring-stop, H, is also provided to engage with a notch, $e$, on the gear-wheel, so as to prevent any back movement of the latter during the stop interval of the binding mechanism. These parts, however, constitute no part of my present invention, which I wish it distinctly understood is confined to the knotting-hook and such parts as are immediately connected with it and necessary to its operation in tying the knot.

In the knotting-hook shown in the drawings the heel of the movable jaw is heavier than the hooked end of the same; but this is not a necessary feature of construction. The end of the rigid jaw has a recess, $a^4$, into which the hooked end of the movable jaw passes more or less when the jaws are closed, as shown in Fig. 3 of the drawings. This end of the movable jaw is also beveled somewhat on each side, so as to be slightly wedge-shaped, as is shown in Fig. 3 of the drawings.

The operation of this knotting-hook is as follows: In Fig. 1 of the drawings the mechanism is represented in the position occupied during the interval of rest, while the grain is being received for the bundle. It will be understood, of course, that one strand of the binding-twine extends from the holder and lays over the pivoted jaw of the hook, and when the binding mechanism is started the needle will place the band around the gavel and lay a second strand over the jaw alongside of the first, and the strands will be brought into the required position by the band-placer, as usual. The revolution of the knotting-hook is now commenced, and a loop is formed around the hook during the first part of the revolution in the usual way. This loop is formed around both jaws, as shown in Fig. 2 of the drawings, and of course tends to close them, and the strands of the binding-twine will be clamped firmly between the jaws as the latter are closed; but just before the jaws reach the two strands of twine extending to the holder they are opened by the action of the cam $d$, against which the roller rests, which is so shaped at the required point that during this part of the revolution of the hook the heel of the movable jaw will be thrown outward, thereby opening the two jaws of the hook sufficiently to receive the two strands between them; but the form of the cam changes, so that as soon as the strands are thus received the jaws are free to close, and will be drawn together by the pull of the cord forming the loop, which is completed with the completion of the single revolution of the hook in the form shown in Fig. 2 of the drawings, and the knotter comes to a state of rest, the strands of twine are cut at once, and the knot-stripping and bundle-discharging mechanism is brought into action, the operation of which is to shed or pull the loop off from the hook when the knot is formed and tightened, as shown in Fig. 4 of the drawings. This operation could not be effected if the jaws of the knotting-hook did not close upon the twine and clamp it between them when held in this position, for obviously, the twine being cut, as soon as the pull was made to shed the loop the ends of the twine would be pulled out from the hook, and thus prevent the forming of a knot if the twine were at all loose between the jaws; but as in my improvement the jaws are tightly closed upon the twine, and are held so by the draw of the loop, the strain on the latter in shedding from the hook will operate to hold and prevent the cut ends from being pulled out, so that the shedding will be completely performed, as there can be no opening of the jaws until the loop is entirely removed from them, and then the loose jaw being released, has a tendency at once to open, and only a slight pull is required to free the twine from the jaws. The outwardly-inclined face and beveled sides of the hook on the movable jaw facilitate this result, this jaw opening as shown in dotted lines in Fig. 4 of the drawings, when of course the bundle is free for its discharge. In this construction of the hook on the movable jaw it is obvious that the pull on the twine will open the jaws as soon as the loop is shed, and only a single revolution of the knotter is necessary; but if the hook on the movable jaw is shaped as in Fig. 5 of the drawings, it is obvious that the pull on the twine will not necessarily open the jaws, as it will be almost directly outward against the nearly straight inner face of this hook, and a second revolution will be required.

In Fig. 1 of the drawings I have also shown a guide, I, which is so arranged as to prevent the heel of the movable jaw from dropping and so opening the jaws of the knotter too widely when the loop is shed and while the knotter stands at rest. It will be seen from this description that none of the usual extra devices are required for closing the jaws of the knotting-hook, and that the latter are closed (as is necessary in forming and shedding the loop) by the pull of the twine during the revolution of the knotter, so that all springs and other like devices are entirely dispensed with.

The particular construction and arrangement of the parts herein described and shown may be varied somewhat and still the principle of my invention retained. The relation of the two jaws may also be changed, the movable jaw standing on the outside and the fixed one on the inside, without substantially changing the principle of operation, provided the other relative parts are also modified in construction and arrangement so as to produce the results hereinbefore set forth; and therefore I do not wish to be understood as restricting my present invention to the precise construction of knotting-hook in all details as herein shown and described.

Having thus described my invention, what I claim as new, and desire to secure by Letters Patent, is—

In a revolving knotting-hook for grain-binders, the rotating shaft B, which carries the hook, in combination with the rigid jaw $a$, the pivoted jaw $a'$, the heel end of which projects beyond the heel of the rigid jaw, a cam, $d$, on the bearing of the shaft, and a guide, I, arranged to prevent the heel of the pivoted jaw from dropping when the loop is shed, substantially as and for the purposes set forth.

CALVIN P. SHUFELT.

Witnesses:
THOMAS H. PEASE,
W. C. CORLIES.